UNITED STATES PATENT OFFICE.

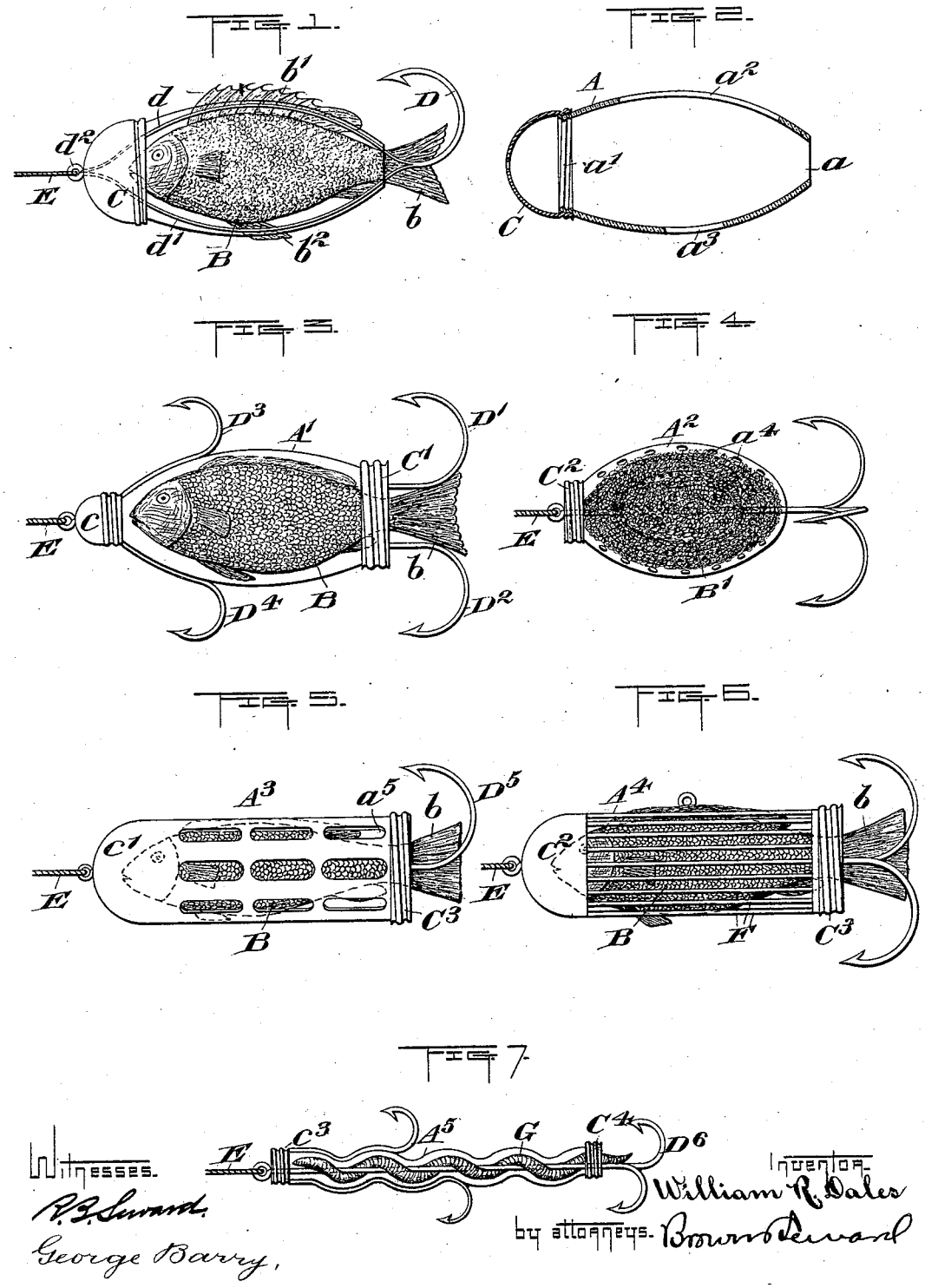

WILLIAM R. DALES, OF NEW YORK, N. Y.

BAIT-GUARD.

SPECIFICATION forming part of Letters Patent No. 556,494, dated March 17, 1896.

Application filed January 31, 1895. Serial No. 536,772. (No model.)

*To all whom it may concern:*

Be it known that I, WILLIAM R. DALES, of the city and county of New York, in the State of New York, have invented a new and useful Improvement in Bait-Guards, of which the following is a specification.

My invention relates to an improvement in bait-guards, in which provision is made for holding live or other bait protected against being consumed by fishes while employed as a bait to induce them to take the hook.

In the accompanying drawings, Figure 1 shows the guard formed of transparent material with a fish confined therein as in use. Fig. 2 is a view of the guard in longitudinal section. Fig. 3 is a view of another form of transparent guard with a fish confined therein. Fig. 4 is a view of another form of transparent guard with fish-spawn therein. Fig. 5 represents an opaque guard with a fish confined therein. Fig. 6 represents another form of opaque guard with fish confined therein, and Fig. 7 represents a transparent guard suitable for holding a worm.

The gist of my invention lies in providing a bait-guard which, while it exposes the bait to a greater or lesser extent, in any event to an extent sufficient to give out the necessary scent, will still protect the fish to such an extent that if it be live bait, as a live fish or worm, it cannot be bitten to any great extent or killed by the fish taking the hook, and if it be dead bait—such, for example, as spawn or entrails—it cannot be consumed or materially interfered with by the fish taking the hook.

It has been found in practice that by leaving the tail of the bait free to wiggle as the fish would naturally move it in swimming, the bait becomes almost as real and attractive as though it were entirely exposed, and the scent of the bait is also much stronger, so that it becomes very effective, while the fish entirely inclosed within a glass case is found to be unsatisfactory because, looking at the casing from the rear end, as a fish naturally does in approaching the bait, the fish to be caught can see little or nothing of the bait, the end of the casing being obstructed and the rays of light falling so obliquely on the side as to be of little use.

In the form shown in Figs. 1 and 2 the bait-guard consists of a pocket or cell A of some suitable transparent material—such, for example, as glass—provided at one end with an opening $a$ sufficiently large to permit the tail $b$ of the fish B to project outside the pocket or cell and at its opposite end with an opening $a'$ sufficiently large to permit the fish to be inserted within the pocket or cell. I prefer also to provide the pocket or cell A with one or more slits, in the present instance with a slit $a^2$, to permit the dorsal fin $b'$ of the fish to project through it and with a slit $a^3$ to permit the vental fin $b^2$ to project through it.

The opening $a'$, through which the fish is inserted, is provided with a screw-threaded neck for the reception of a cap C, which may be screwed onto the end of the pocket or cell A to close it.

The hook (denoted by D) is in this instance provided with a split shank, the branches $d$ $d'$ of which are made to spread apart as they pass through the pocket or cell A, and, projecting through the apex of the cap C, form an eye $d^2$ for the reception of the fish-line E. The fish B incased in this manner within the pocket or cell may be towed through the water without danger of being drowned, and it has been found by experience that a bait-fish will live in such a pocket for several months, and that having been used as bait and repeatedly swallowed by a fish taking the hook it may be again released in apparently unharmed condition to serve as bait for another day, if desired.

In the form shown in Fig. 3 the pocket or cell $a'$ is provided at its tail end with a larger opening for inserting the live bait therein, a screw-cap C' being employed to form the necessary closure to retain the fish therein, while permitting the tail of the fish to project through the cap. In this form I have shown the cell as provided with several hooks, two of them, D' and D², projecting from the cap C', and two others, D³ and D⁴, projecting from the head-cap $c$, to which the line E is secured.

In the form shown in Fig. 4 the pocket or cell A² is provided with perforations $a^4$ and is adapted to receive spawn or other dead bait B'. In this instance a gang-hook has its shank extended centrally through the pocket or cell and the line E fastened directly to the shank of the hook, the opening for inserting the dead bait within the pocket or cell being closed by a screw-cap $C^2$.

In the form shown in Fig. 5 the pocket or cell $A^3$ is formed of opaque material and is in the form of a cylinder with a rounded head $c'$, to which the line E is secured, and its tail end is closed by a screw-cap $C^3$, through which the tail of the fish B is permitted to project, the hook $D^5$ being secured to said cap $C^3$. In this instance the pocket $A^3$ is provided with openings $a^5$ to expose the fish to view to a greater or less extent, the openings $a^5$ being of such dimensions as to prevent a fish taking the hook from getting a bite on the confined bait-fish.

In Fig. 6 I have shown a pocket or cell $A^4$ quite similar in outline to that represented in Fig. 5, but exposing the bait-fish more to view by means of connecting the head-piece $c^2$, to which the line E is attached, with the rim for receiving the screw-cap $C^3$ by means of a series of rods or bars F.

In the form shown in Fig. 7 I have shown the transparent pocket or cell $A^5$ as elongated and wavy for the reception of a live worm G. The head of the pocket is closed by a screw-cap $c^3$ and its tail end by a screw-cap $C^4$, through which one end of the worm is permitted to project, the hook $D^6$ having its shank in this instance extended throughout the length of the cell or pocket $A^5$ and provided with an eye to which the line E is secured.

The above-described forms of cells or pockets are a few only of many different shapes and structures which might be devised for confining either live or dead bait in such a manner as to prevent injury or waste while fishing. I do not, therefore, wish to confine myself strictly to these structures which I have herein shown and described; but

What I claim is—

1. A bait-guard, comprising a cell or pocket adapted to receive and retain live bait and provided with an opening for the projection of some portion of said live bait and means for securing a hook in proximity to said cell or pocket, substantially as set forth.

2. A bait-guard, comprising a cell or pocket adapted to receive and retain live bait and provided with an opening at its tail end for the projection of the tail of the bait and means for securing a hook in proximity to the cell or pocket, substantially as set forth.

3. A bait-guard, comprising a transparent cell or pocket adapted to receive and retain live bait and provided with an opening for the projection of a portion of said bait, said cell or pocket being closed at its forward end and means for securing a hook in proximity to the cell or pocket, substantially as set forth.

4. A bait-guard, comprising a cell or pocket adapted to receive and retain live bait, a hook having its bight located at the tail end of said pocket and its shank separated into branches and extended to the head of the pocket, substantially as set forth.

5. A bait-guard, comprising a transparent cell or pocket, adapted to receive and retain live bait therein and provided with an opening for the projection of a portion of the bait, a cap screwed onto one end of said cell or pocket and means for securing a hook in proximity to said cell or pocket, substantially as set forth.

WILLIAM R. DALES.

Witnesses:
 FREDK. HAYNES,
 IRENE B. DECKER.